(12) United States Patent
Shin

(10) Patent No.: US 10,495,952 B2
(45) Date of Patent: Dec. 3, 2019

(54) LENS BRACKET FOR SECURITY CAMERA AND SECURITY CAMERA HAVING THE SAME

(71) Applicant: Hanwha Techwin Co., Ltd., Seongnam-si (KR)

(72) Inventor: Hyun Soo Shin, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/198,712

(22) Filed: Nov. 21, 2018

(65) Prior Publication Data
US 2019/0324352 A1 Oct. 24, 2019

(30) Foreign Application Priority Data

Apr. 24, 2018 (KR) .......................... 10-2018-0047323

(51) Int. Cl.
*G03B 17/56* (2006.01)
*G02B 7/02* (2006.01)

(52) U.S. Cl.
CPC ............. *G03B 17/561* (2013.01); *G02B 7/02* (2013.01)

(58) Field of Classification Search
None
See application file for complete search history.

(56) References Cited

U.S. PATENT DOCUMENTS

| 9,438,782 | B2 | 9/2016 | Donaldson |
| 2007/0189764 | A1 | 8/2007 | Ingalls et al. |
| 2009/0183365 | A1* | 7/2009 | Hsiao .......................... G02B 7/02 29/836 |
| 2011/0001940 | A1* | 1/2011 | Kuroda ..................... G02B 7/02 353/101 |
| 2012/0062789 | A1* | 3/2012 | Sasaki ..................... G03B 17/00 348/373 |
| 2012/0217356 | A1 | 8/2012 | Park et al. |
| 2013/0160345 | A1 | 6/2013 | Li et al. |
| 2015/0090849 | A1 | 4/2015 | Breitweiser et al. |
| 2015/0326759 | A1* | 11/2015 | Mukai ..................... G03B 17/02 348/374 |
| 2017/0299949 | A1 | 10/2017 | Donaldson |
| 2018/0356710 | A1* | 12/2018 | Bingleman ............ G03B 17/26 |
| 2018/0367738 | A1* | 12/2018 | Fukuzawa .............. H02N 2/163 |
| 2019/0058813 | A1* | 2/2019 | Chen ..................... H04N 5/2252 |
| 2019/0086789 | A1* | 3/2019 | Tsai ..................... G03B 17/561 |
| 2019/0191059 | A1* | 6/2019 | Park ..................... H04N 5/2251 |

FOREIGN PATENT DOCUMENTS

| FR | 3017020 | 7/2015 |
| KR | 10-2008-0011962 | 2/2008 |
| KR | 10-0997877 | 12/2010 |

OTHER PUBLICATIONS

EP Search Report dated Jul. 24, 2019 in corresponding Appl. No. 18212309.1.

* cited by examiner

*Primary Examiner* — William B Perkey
(74) *Attorney, Agent, or Firm* — H.C. Park & Associates, PLC

(57) ABSTRACT

A lens bracket including: a fixed portion on which a lens assembly is provided; a moving portion connected to the fixed portion and moving along a rail; a coupling protrusion provided on the moving portion and selectively coupled to an inner surface of the rail; and a hooking portion provided on the moving portion, the hooking portion facing the coupling protrusion, and selectively contacting a rail protrusion of the rail.

20 Claims, 11 Drawing Sheets

LENS BRACKET FOR SECURITY CAMERA AND SECURITY CAMERA HAVING THE SAME

CROSS-REFERENCE TO RELATED APPLICATION

This application claims priority from and the benefit of Korean Patent Application No. 10-2018-0047323, filed on Apr. 24, 2018, which is hereby incorporated by reference for all purposes as if fully set forth herein.

BACKGROUND

Field

Exemplary embodiments/implementations of the invention relate generally to an apparatus and, more specifically, to a lens bracket for a security camera and a security camera having the same.

Discussion of the Background

General security cameras may photograph events occurring outside by using cameras. Recently, a security camera may have a plurality of lens assemblies to capture an image of an event occurring in various directions.

Various structures may be employed to arrange a plurality of lens assemblies at various angles. A plurality of lens assemblies are generally fixed at particular positions in a housing using screws or bolts. In this case, when at least one of the lens assemblies is removed, positions of the other lens assemblies may not be changed, and thus a wide blind spot of a security camera may be generated.

Furthermore, when a plurality of lens assemblies are used, the lens assemblies may be fixed at various positions. A housing needs to be changed to arrange each of the lens assemblies that are fixed at another position in the housing. In addition, the lens assemblies arranged at particular positions may not be able to be installed at other positions.

U.S. Patent Publication No. 2017-0299949 (Title of the Invention: Omnidirectional User Configurable Multi-Camera Housing, Applicant: Arecont Vision, LLC) discloses such a security camera.

The above information disclosed in this Background section is only for understanding of the background of the inventive concepts, and, therefore, it may contain information that does not constitute prior art.

SUMMARY

Devices constructed according to exemplary implementations of the invention include a lens bracket for a security camera and a security camera having the same.

Additional features of the inventive concepts will be set forth in the description which follows, and in part will be apparent from the description, or may be learned by practice of the inventive concepts.

According to one or more exemplary embodiments, a lens bracket includes: a fixed portion on which a lens assembly is provided; a moving portion connected to the fixed portion and moving along a rail; a coupling protrusion provided on the moving portion and selectively coupled to an inner surface of the rail; and a hooking portion provided on the moving portion, the hooking portion facing the coupling protrusion, and selectively contacting a rail protrusion of the rail.

The hooking portion may include a coupling connection portion protruding from the moving portion toward the rail, at least a part of the coupling connection portion being bent surrounding a side surface of the rail; and a position fixing protrusion protruding from the coupling connection portion toward the rail protrusion of the rail.

The coupling protrusion may protrude from the moving portion toward the rail, and at least a part of the coupling protrusion may be bent surrounding the rail.

The moving portion may include a moving body portion, and a handle portion provided separately from the moving body portion, the hooking portion being connected to the handle portion.

The lens bracket may further include a guide that is spaced apart from the hooking portion and protruding from the moving portion toward the rail.

The lens bracket may further include a contact protrusion that protrudes from a lower surface of the moving portion toward the rail.

According to one or more exemplary embodiments, a security camera include a lens assembly; a lens bracket into which a protruding portion of the lens assembly is rotatably inserted; and a stopper provided on the lens assembly and rotating in contact with the lens bracket during rotation of the lens assembly, wherein the stopper determines an angle range in which the protruding portion of the lens assembly is drawn from an open portion of the lens bracket and thus the lens assembly and the lens bracket are separated from each other.

The security camera may further include a rotation prevention portion that is provided on at least one of the lens bracket and the stopper.

A part of the lens bracket that the stopper contacts may be curved.

According to one or more exemplary embodiments, a security camera include: a lens assembly; a lens bracket into which a protruding portion of the lens assembly is rotatably inserted; and a lens assembly accommodation portion spaced apart from the lens bracket, into which the lens assembly separated from the lens bracket is inserted and fixed.

The lens assembly may include a stopper that determines an angle range in which the protruding portion of the lens assembly is drawn from an open portion of the lens bracket and thus the lens assembly and the lens bracket are separated from each other.

The security camera may further include a rotation prevention portion that is provided on at least one of the lens bracket and the stopper.

A part of the lens bracket that the stopper contacts may be curved.

The lens assembly accommodation portion may include a snap fit into which the stopper is inserted and fixed.

The lens assembly may include: a lens module; a lens housing in which the lens module is provided; a rotation axis protruding from the lens housing and inserted into an insertion groove; and a stopper protruding from the lens housing and moving in contact with an outer surface of a fixed portion during rotation of the lens housing.

The security camera may further include a rotation prevention portion that is provided on at least one of the fixed portion and the stopper.

A part of the fixed portion that the stopper contacts may be curved.

The lens assembly accommodation portion may include a snap fit into which the stopper is inserted and fixed.

The lens assembly accommodation portion may include a rotation axis insertion groove into which a rotation axis of the lens assembly is inserted.

The lens assembly may include a plurality of lens assemblies and the lens bracket includes a plurality of lens brackets, a circular rail is provided on which the plurality of lens brackets independently move, one of the plurality of lens assemblies is provided on the lens assembly accommodation portion located at a center of the rail, and other lens assemblies of the plurality of lens assemblies are provided on the plurality of lens brackets spaced apart from one another.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
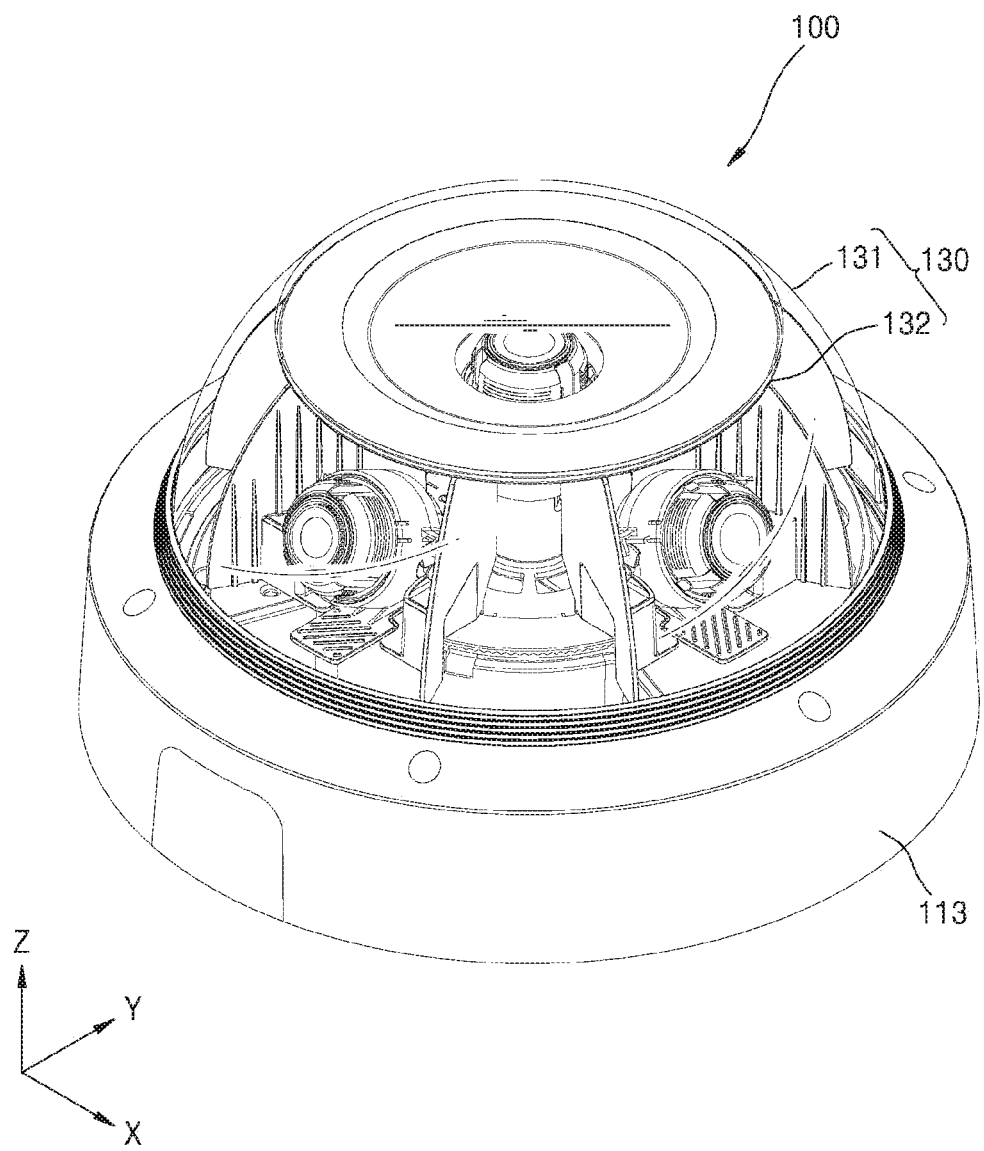
FIG. 1 is a perspective view of a security camera according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalties between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
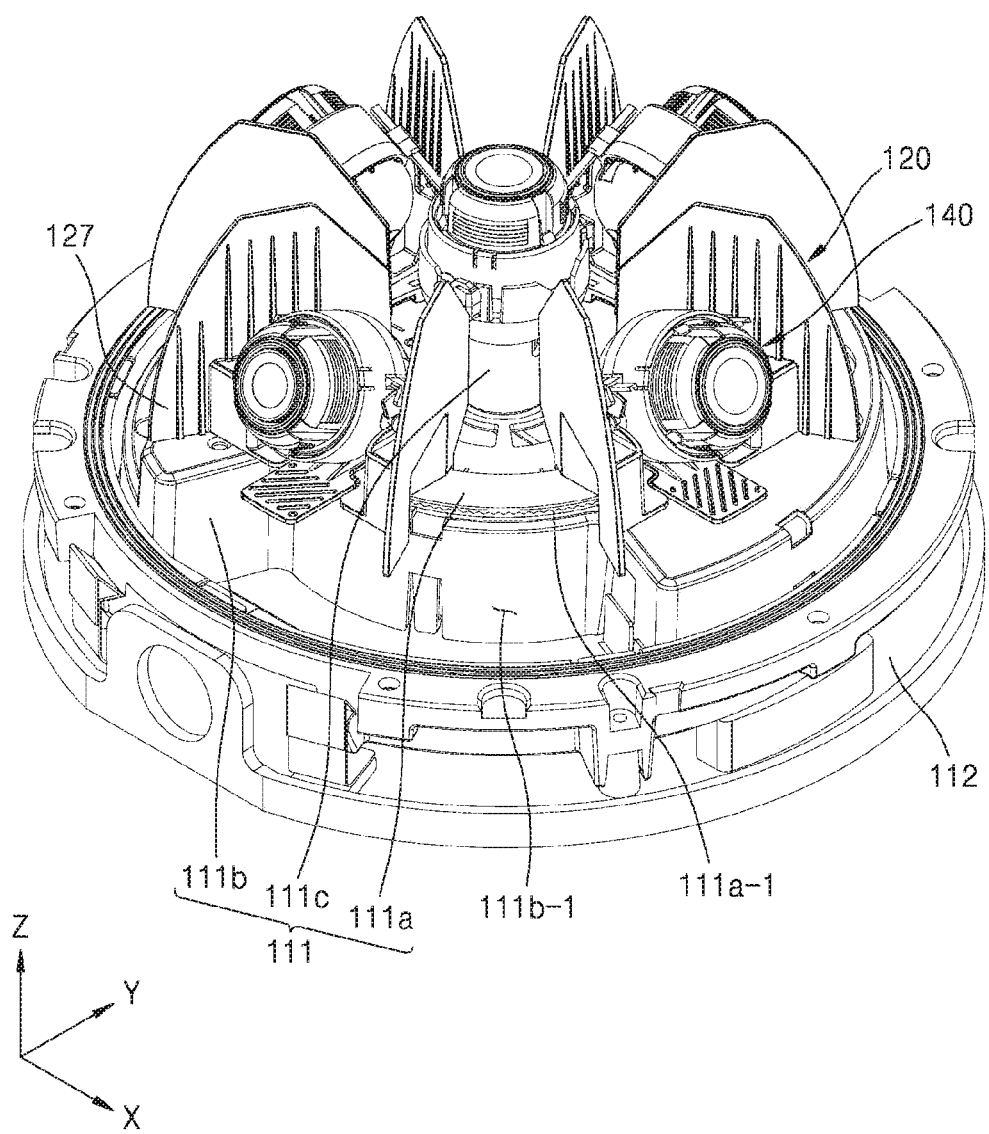
FIG. 2 is a perspective view of a part of the security camera of FIG. 1.

FIG. 1 is a perspective view of a security camera 100 according to an exemplary embodiment. FIG. 2 is a perspective view of a part of the security camera 100 of FIG. 1.

Referring to FIGS. 1 and 2, the security camera 100 may include a base housing 111, a fixed housing 112, a cover housing 113, a lens bracket 120, a cover 130, and a lens assembly 140.

The lens bracket 120 may be arranged on the base housing 111. Furthermore, the base housing 111 may be fixed on the fixed housing 112. In this state, the base housing 111 may include a rail 111a on which the lens bracket 120 is arranged, a base housing body portion 111b on which the rail 111a is arranged, and a lens assembly accommodation portion 111c arranged at a center of the base housing body portion 111b.

The rail 111a may have a annular shape. Furthermore, a lower surface of the rail 111a may be formed uneven. For example, the rail 111a may include a rail protrusion 111a-1 protruding from the lower surface thereof. In this state, the rail protrusion 111a-1 may include a plurality of rail protrusions, and the rail protrusions 111a-1 may be arranged on the lower surface of the rail 111a around the outer periphery of the rail 111a. Each of the rail protrusions 111a-1 may be arranged on the lower surface of the rail 111a such that a lengthwise direction of each of the rail protrusions 111a-1 directs to the center of the rail 111a.

The base housing body portion 111b may be arranged on the lower surface of the rail 111a. In this state, the rail 111a may be spaced apart from an upper surface of the base housing body portion 111b. The base housing body portion 111b may be provided with a first groove 111b-1 for inserting or removing when the lens bracket 120 is coupled to the rail 111a or separated from the rail 111a. The first groove 111b-1 may be indented from an outer surface of the base housing body portion 111b toward a center portion of the base housing body portion 111b.

The lens assembly accommodation portion 111c may be located at the center of the rail 111a and in which one of a plurality of the lens assemblies 140 may be arranged. In this case, the lens assembly accommodation portion 111c may be coupled to the lens assembly 140 in various forms of inserting the lens assembly 140 therein or fixing the lens assembly 140 thereto. Furthermore, the lens assembly accommodation portion 111c may be formed integrally with the base housing body portion 111b, or separately from the base housing body portion 111b and coupled to the base housing body portion 111b. When the base housing body portion 111b and the lens assembly accommodation portion 111c are separately coupled to each other, the base housing body portion 111b and the lens assembly accommodation portion 111c may be coupled by various methods. In an exemplary embodiment, the base housing body portion 111b and the lens assembly accommodation portion 111c may be connected to each other using various members such as screws or bolts. In another exemplary embodiment, a protrusion such as a hook is formed on one of the base housing body portion 111b and the lens assembly accommodation portion 111c and a recess for accommodating the protrusion is formed in the other one of the base housing body portion 111b and the lens assembly accommodation portion 111c, and then as the protrusion is inserted into the recess, the base housing body portion 111b and the lens assembly accommodation portion 111c may be coupled to each other. In the following description, for convenience of explanation, a case in which the base housing body portion 111b and the lens assembly accommodation portion 111c are separately formed and coupled to each other is mainly described in detail.

The base housing 111 may be coupled to the fixed housing 112. In this state, the fixed housing 112 may be fixed to an outer wall of a building. In this state, the fixed housing 112 may be fixed using bolts or screws. The base housing 111 and the fixed housing 112 may be coupled by various methods. For example, the base housing 111 and the fixed housing 112 may be coupled to each other using bolts, screws, or pins. In another exemplary embodiment, the base housing 111 may be pivotably coupled to the fixed housing 112 and may be connected to the fixed housing 112 using a hook.

The cover housing 113 is coupled to at least one of the fixed housing 112 and the base housing 111 and may fix the cover 130. In this state, the cover housing 113 may shield a part of the cover 130 and may shield the fixed housing 112 and the base housing 111.

The lens bracket 120 may be detachably coupled to the rail 111a. The lens bracket 120 may be coupled to the rail 111a to be movable along the rail 111a.

The cover 130 may be coupled to the base housing 111 and may shield parts arranged between the cover 130 and the base housing 111 from the outside. The cover 130 may include a cover body portion 131 and a force applying portion 132.

The cover body portion 131 may have a dome shape with a partially flat portion. For example, in the cover body portion 131, a side portion of the base housing 111 may be formed to be curved and one surface of the cover body portion 131 facing the ground may be formed to be flat. The cover body portion 131 may be formed of a transparent material such as acryl, glass, or plastic. Furthermore, a sealing member may be provided between the cover body portion 131 and the base housing 111 to prevent intrusion of moisture from the outside. The cover body portion 131 and the base housing 111 may be coupled to each other by various methods. In an exemplary embodiment, the cover body portion 131 and the base housing 111 may be fixed using a separate clamp. In another exemplary embodiment, a protrusion may be formed on one of the cover body portion 131 and the base housing 111, and a groove or hole for accommodating the protrusion may be formed in the other one of the cover body portion 131 and the base housing 111. Accordingly, as the protrusion is inserted into the groove or hole, the cover body portion 131 and the base housing 111 may be coupled to each other.

The force applying portion 132 may protrude from the cover body portion 131 toward the lens bracket 120. In this state, the force applying portion 132 may be integrally formed with the cover body portion 131, or separately from the cover body portion 131 and coupled to the cover body portion 131. When the force applying portion 132 is integrally formed with the cover body portion 131, the force applying portion 132 may be formed of the same material as the cover body portion 131. When the force applying portion 132 is formed separately from the cover body portion 131, the force applying portion 132 may be coupled to the cover body portion 131 using a separate adhesive member. In this state, the force applying portion 132 may be formed of an elastic material such as rubber, silicon, or plastic. In the following description, for convenience of explanation, a case in which the force applying portion 132 is formed separately from the cover body portion 131 and coupled to the force applying portion 132 is mainly described in detail.

The lens assembly 140 may be coupled to at least one of the lens assembly accommodation portion 111c and the lens bracket 120. In this state, the lens assembly 140 may include a plurality of lens assemblies, in which one of the lens assemblies 140 may be coupled to the lens assembly accommodation portion 111c and the others may be coupled to the lens bracket 120. In this case, the lens bracket 120 may include a plurality of lens brackets corresponding to the number of lens assemblies 140.

Figure 3:
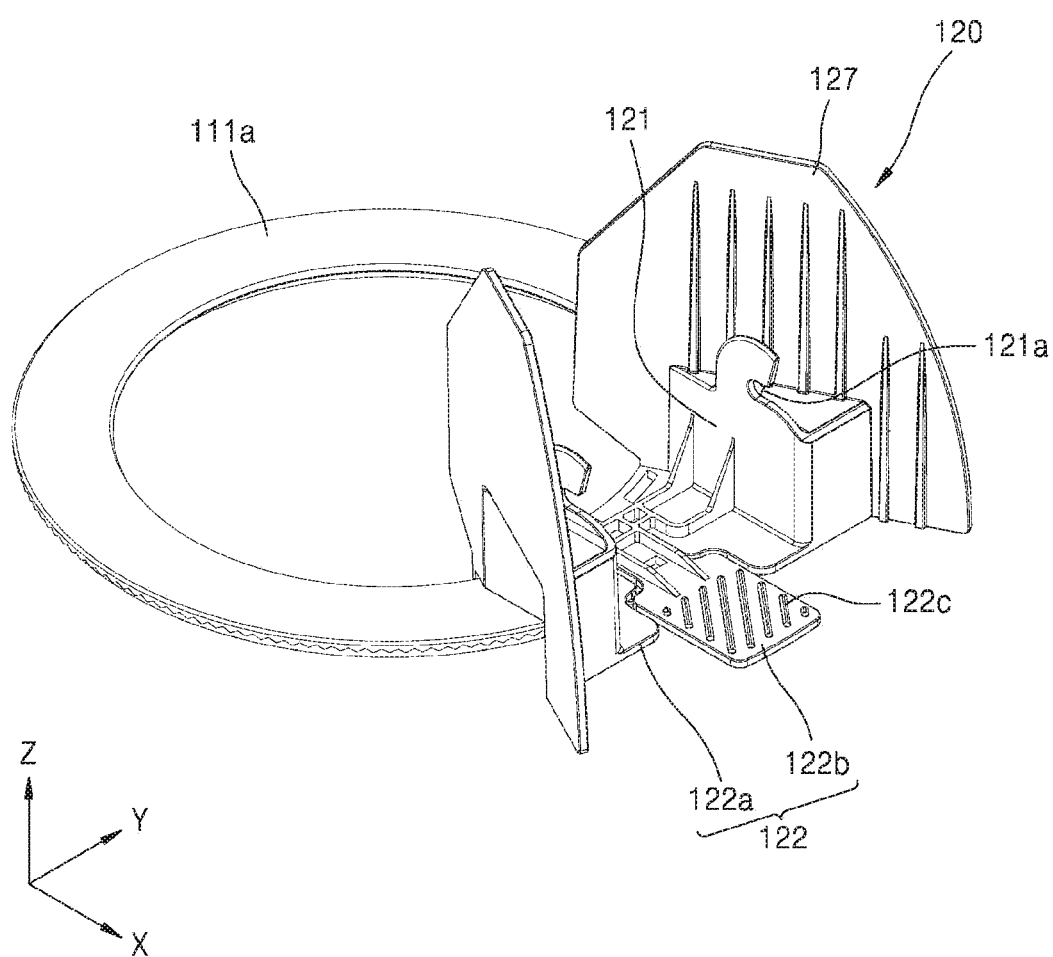
FIG. 3 is a perspective view of a lens bracket and a rail illustrated in FIG. 2.
Figure 4:
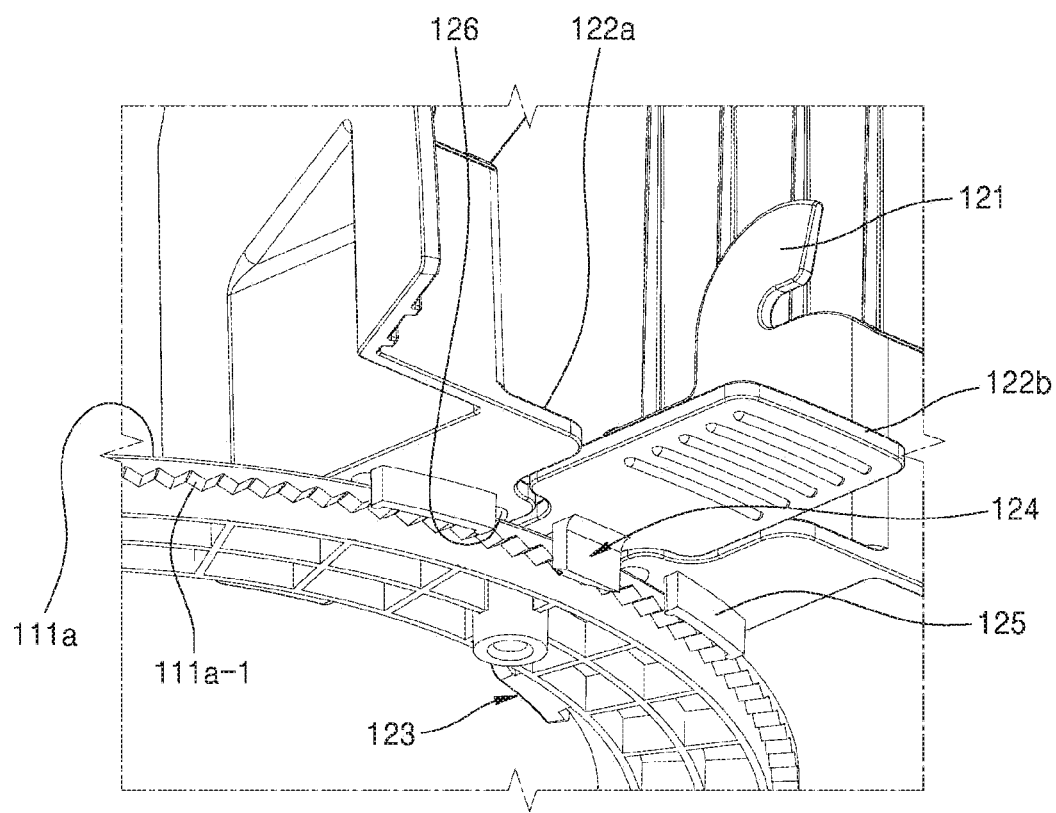
FIG. 4 is a partial perspective view showing lower surfaces of the lens bracket and the rail of FIG. 3.
Figure 5:
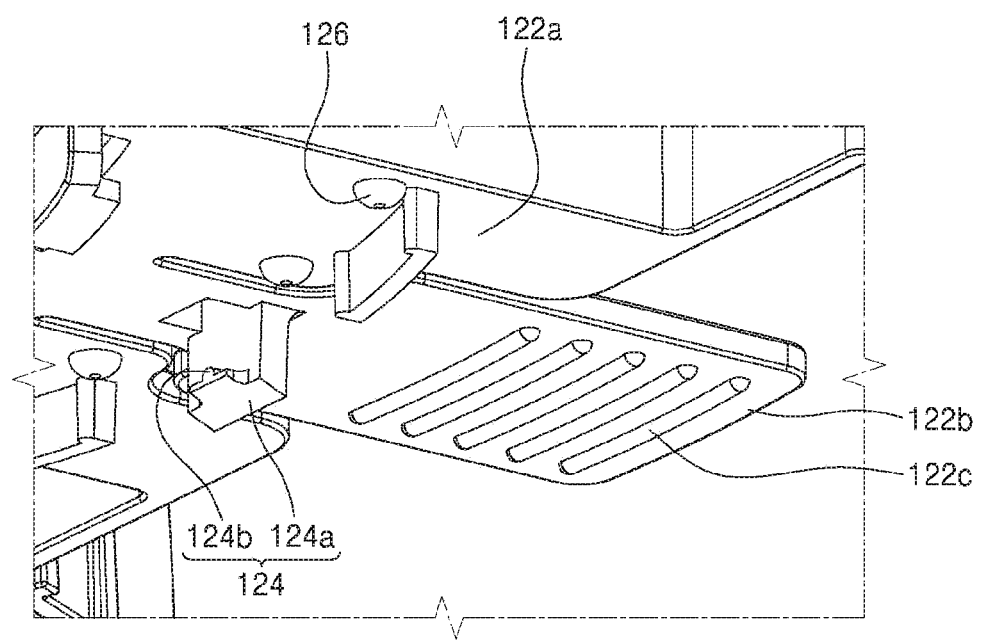
FIG. 5 is a partial perspective view of the lower surface of the lens bracket of FIG. 2.
Figure 6:
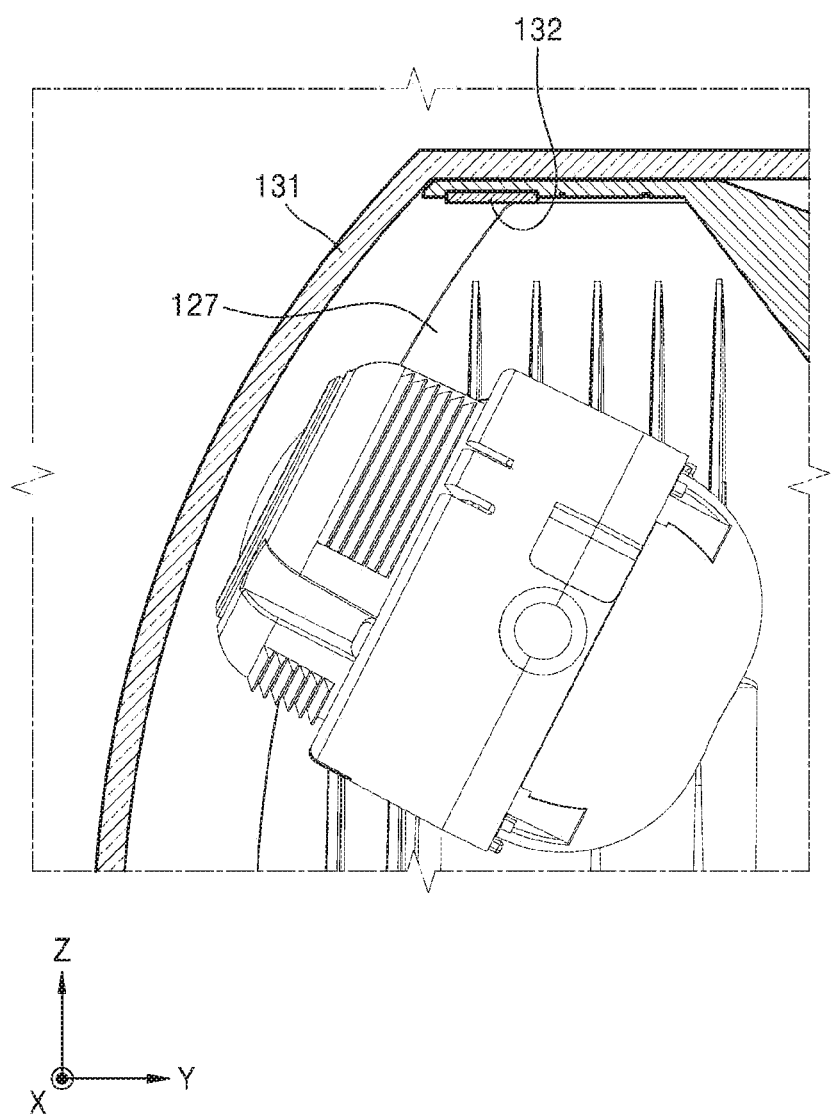
FIG. 6 is a cross-sectional view of a part of the security camera of FIG. 1.

FIG. 3 is a perspective view of the lens bracket 120 and the rail 111a illustrated in FIG. 2. FIG. 4 is a partial perspective view showing lower surfaces of the lens bracket 120 and the rail 111a of FIG. 3. FIG. 5 is a partial perspective view of the lower surface of the lens bracket 120 of FIG. 2. FIG. 6 is a cross-sectional view of a part of the security camera 100 of FIG. 1.

Referring to FIGS. 3 to 6, the lens bracket 120 may include a fixed portion 121, a moving portion 122, a coupling protrusion 123, a hooking portion 124, a guide 125, a contact protrusion 126, and a partition wall 127.

The lens assembly 140 may be fixedly inserted into fixed portion 121. In this state, the fixed portion 121 may protrude from the moving portion 122 toward the cover 130. The fixed portion 121 may be connected to the lens assembly 140 by various methods. For example, a hole, into which a part of the lens assembly 140 is inserted, is formed in the fixed portion 121, and as the part of the lens assembly 140 is inserted into the hole, the lens assembly 140 may be coupled to the fixed portion 121. In another exemplary embodiment, the fixed portion 121 may include an insertion groove 121a along which the part of the lens assembly 140 may be removed in a direction. In this case, as the part of the lens assembly 140 is inserted into or removed from the insertion groove 121a, the lens assembly 140 may be coupled to or separated from the fixed portion 121. In another exemplary embodiment, the lens assembly 140 may be rotatably coupled to the fixed portion 121 using a pin. In the following description, however, for convenience of explanation, a case in which the insertion groove 121a is formed in the fixed portion 121 and the lens assembly 140 is coupled to the fixed portion 121 is mainly described in detail.

The moving portion 122 may include a moving body portion 122a and a handle portion 122b. The moving body portion 122a may be parallel to an upper surface of the rail 111a, for example, a surface facing a surface on which the rail protrusion 111a-1 is formed. Furthermore, the moving body portion 122a may have a partial fan shape having a diameter that is the same as or similar to that of the rail 111a. In other words, the shape of the moving body portion 122a may be the same as or similar to that of a portion of the rail 111a. The handle portion 122b may be separated from the moving body portion 122a, and one end of the handle portion 122b may be connected to the moving body portion 122a. In this case, the handle portion 122b, when receiving a force, may pivot a certain distance (ex, a certain angle) around the moving body portion 122a. Furthermore, an anti-slip portion 122c may be provided on a surface of the handle portion 122b. The anti-slip portion 122c may include a plurality of anti-slip protrusions (not shown) spaced apart from each other. In another exemplary embodiment, the anti-slip portion 122c may include a protrusion arranged on the surface of the handle portion 122b. In another exemplary embodiment, the anti-slip portion 122c may have a roughness that is greater than that of the other portion of the handle portion 122b. In the following description, for convenience of explanation, a case in which the anti-slip portion 122c includes the anti-slip protrusion is mainly described in detail. The anti-slip portion 122c may be arranged on at least one surface of the handle portion 122b. For example, the anti-slip portion 122c may be arranged on at least one of upper and lower surfaces of the handle portion 122b. In the following description, for convenience of explanation, a case in which the anti-slip portion 122c is provided on both of the upper and lower surfaces of the handle portion 122b is mainly described in detail.

The coupling protrusion 123 may be arranged on the moving portion 122 to surround an inner surface of the rail 111a. In this state, the coupling protrusion 123 is formed to be bent and thus surrounds the inner surface of the rail 111a and the lower surface of the rail 111a. The coupling protrusion 123 may include at least one coupling protrusion. In particular, when the coupling protrusion 123 includes a plurality of coupling protrusions, the coupling protrusions 123 may be spaced apart from a lower surface of the moving portion 122. In the following description, for convenience of explanation, a case in which the coupling protrusion 123 includes two coupling protrusions is mainly described in detail. In this case, a distance between the coupling protrusions 123 may be greater than a width of a portion of the handle portion 122b connected to the moving body portion 122a.

The hooking portion 124 may be arranged on the handle portion 122b. In this state, the hooking portion 124 may be provided between the two coupling protrusions 123. In this case, the hooking portion 124 and the two coupling protrusions 123 may be arranged in a triangular shape. As at least a part of the hooking portion 124 is formed to be bent, the hooking portion 124 may include a coupling connection portion 124a that is arranged to surround outer and lower surfaces of the rail 111a. In this state, the coupling connection portion 124a may be similar to the coupling protrusion 123. The hooking portion 124 may include a position fixing protrusion 124b that protrudes toward the rail protrusion 111a-1. The position fixing protrusion 124b may contact the lower surface of the rail 111a during moving of the moving portion 122. In particular, during the moving of the moving portion 122, the position fixing protrusion 124b may contact the rail protrusion 111a-1 or enter between the rail protrusions 111a-1 that neighbor each other. The position fixing protrusion 124b may not only prevent the speed of the moving portion 122 from slowing down during the moving of the moving portion 122, but also fix the position of the moving portion 122, to a degree, after the moving of the moving portion 122.

The guide 125 may protrude from the moving body portion 122a toward the rail 111a. In this state, the guide 125 may be arranged at a side surface of the moving body portion 122a on which the hooking portion 124 is arranged. The guide 125 may shield a side surface of the rail 111a. The guide 125 may be formed in various shapes. In an exemplary embodiment, the guide 125 may be arranged on at least a portion of a side surface of the moving body portion 122a. In another exemplary embodiment, the guide 125 may include a plurality of guides, and the guides 125 may be spaced apart from each other on the side surface of the moving body portion 122a. In the following description, for convenience of explanation, a case in which the guide 125 includes a plurality of guides and the guides 125 are spaced apart from each other is mainly described in detail.

The contact protrusion 126 may be arranged on a lower surface of the moving body portion 122a. In this state, the contact protrusion 126 may protrude from the lower surface of the moving body portion 122a toward the rail 111a. When the moving portion 122 is stopped, the contact protrusion 126 may have a point contact or a surface contact with the rail 111a. The contact protrusion 126 may include a plurality of contact protrusions, and the contact protrusions 126 may be arranged on the moving body portion 122a to be spaced apart from each other. When the moving portion 122 is accommodated on the rail 111a, the contact protrusion 126 may allow the position fixing protrusion 124b to contact the rail protrusion 111a-1 or the lower surface of the rail 111a between the neighboring rail protrusions 111a-1.

The partition wall 127 may be formed integrally with or separately from the moving portion 122. In this state, when the partition wall 127 is formed separately from the moving portion 122, the partition wall 127 may be formed similar to the moving portion 122 and coupled to the rail 111a and may perform a linear motion along the rail 111a. For example, the partition wall 127, similar to the lens bracket 120, may include the fixed portion 121, the moving portion 122, the coupling protrusion 123, the hooking portion 124, the guide 125, and the contact protrusion 126. In the following description, for convenience of explanation, a case in which the partition wall 127 is integrally formed with the moving portion 122 is mainly described in detail.

The partition wall 127 may be connected to the fixed portion 121. Furthermore, the partition wall 127 may protrude from the moving body portion 122a toward the cover 130. The partition wall 127 may include a pair of partition walls to face each other with respect to the moving portion 122. In this case, the partition walls 127 may block part of light incident on the lens assembly 140 provided on the moving portion 122. The partition wall 127 may be radially arranged around the lens assembly 140. For example, each of the partition walls 127 may be arranged to face the center of the rail 111a.

The lens bracket 120 as described above may be separated from the rail 111a. In particular, when the lens brackets 120 are arranged on the rail 111a, at least one of the lens brackets 120 may be removed from the rail 111a because the position of the lens assembly 140 is changed or the number of lens assemblies 140 is adjusted.

In detail, when the lens bracket 120 is separated from the rail 111a, the handle portion 122b may receive a force in a direction away from the upper surface of the rail 111a. In this case, the handle portion 122b may be bent in a direction away from the upper surface of the rail 111a with respect to the moving body portion 122a. The hooking portion 124 with the handle portion 122b may be separated from the rail 111a. For example, when the handle portion 122b is bent as above, part of the coupling connection portion 124a may be moved from the lower surface of the rail 111a in a circumferential direction of the rail 111a. In this state, the coupling connection portion 124a may open parts of the lower and side surfaces of the rail 111a. Furthermore, the position fixing protrusion 124b may be completely separated from the lower surface of the rail 111a. Furthermore, as the handle portion 122b is continuously rotated as above, the lens bracket 120 may rotate around the coupling protrusion 123 and may be separated from the rail 111a. Then, the lens bracket 120 is moved in a direction toward the center of the rail 111a, and thus the coupling protrusion 123 may be separated from the rail 111a. A place where the lens bracket 120 is separated from the rail 111a may be the first groove 111b-1 of the base housing 111, as described above.

As described above, when one of the lens brackets 120 is separated from or arranged on the rail 111a, at least one of the lens brackets 120 may be moved on the rail 111a.

In a method of moving the lens assembly 140 via the lens bracket 120, the lens bracket 120, which is coupled to the rail 111a, may be moved along the rail 111a. In this state, a user may apply a force to the handle portion 122b toward the rail 111a. In this case, the handle portion 122b may be bent towards the upper surface of the rail 111a, and thus the hooking portion 124 with the handle portion 122b may be moved. In this case, the position fixing protrusion 124b of the hooking portion 124 may be separated from the rail protrusion 111a-1 formed on the lower surface of the rail 111a or withdrawn from the groove between the rail protrusions 111a-1. As such, when the hooking portion 124 performs a motion, the position fixing protrusion 124b is released from the rail protrusion 111a-1, and thus the lens bracket 120 may freely move along the rail 111a. In this case, additionally, the user may move the lens bracket 120 on the rail 111a without applying a force to the handle portion 122b. In detail, when the lens bracket 120 is moved on the rail 111a, the position fixing protrusion 124b, which moves with the lens bracket 120, may contact an outer surface of the rail protrusion 111a-1. In this state, the position of the position fixing protrusion 124b may be changed by the rail protrusion 111a-1, and the handle portion 122b may be bent a certain distance according to the position of the position fixing protrusion 124b. For example, when the position fixing protrusion 124b is located at a position where the rail protrusion 111a-1 is the thickest, the handle portion 122b may be bent toward the rail 111a, and when the position fixing protrusion 124b is arranged in the groove between the rail protrusions 111a-1, the handle portion 122b may return to the original state. In this above state, during rotation of the lens bracket 120, the lens bracket 120 may not smoothly move on the rail 111a due to the position fixing protrusion 124b, but may prevent the position of the lens bracket 120 from being changed too fast.

The contact protrusion 126 may prevent the lens bracket 120 from moving at a fast speed. In detail, as described above, when the lens bracket 120 moves on the rail 111a, the contact protrusion 126 may be arranged to face the position fixing protrusion 124b and thus may apply a force to the moving portion 122 in a direction opposite to the position fixing protrusion 124b. In particular, when the lens bracket 120 moves on the rail 111a, the contact protrusion 126 may contact the upper surface of the rail 111a and may provide a frictional force to the lens bracket 120 during the moving of the lens bracket 120. Furthermore, when the position fixing protrusion 124b moves along the outer surface of the rail protrusion 111a-1, the contact protrusion 126 may contact the upper surface of the rail 111a. In addition to the above case, when a force is applied to the handle portion toward the rail 111a, the contact protrusion 126 may contact the upper surface of the rail 111a. Due to the above contact, the contact protrusion 126 may provide a certain degree of a frictional force to the lens bracket 120 during the moving of the lens bracket 120, and thus a rapid position change of the lens bracket 120 due to the fast speed of the lens bracket 120 may be prevented. When the lens bracket 120 is stopped, the contact protrusion 126 with the rail 111a may fix the position of the lens bracket 120. In detail, when the lens bracket 120 is stopped, the position fixing protrusion 124b may be arranged between the neighboring rail protrusions 111a-1. In this state, since a distance between an end portion of the position fixing protrusion 124b and an end portion of the contact protrusion 126 is less than a distance from the thickest position of the rail protrusion 111a-1 to the upper surface of the rail 111a, when the lens bracket 120 starts to move, the position fixing protrusion 124b may be prevented from moving along the outer surface of the rail protrusion 111a-1 to a degree. In particular, in this case, when a force over a certain amount is not applied to the lens bracket 120, the lens bracket 120 may not be moved on the rail 111a.

A user may arrange the lens assembly 140 in the lens bracket 120 and then place the lens bracket 120 on the rail 111a. In the coupling of the lens bracket 120 to the rail 111a, the lens bracket 120 may be coupled to the rail 111a by applying a force to the lens bracket 120 on the upper surface of the rail 111a or by first coupling one of the coupling protrusion 123 and the hooking portion 124 to the rail 111a and then rotating the lens bracket 120. In detail, when the lens bracket 120 is placed on the rail 111a and then a force is applied to the lens bracket 120, as the coupling protrusion 123 and the hooking portion 124 are separated from each other in opposite directions, the lens bracket 120 may be coupled to the rail 111a. In this state, since the coupling protrusion 123 and the hooking portion 124 are elastic, at least one of an end portion of the coupling protrusion 123 and an end portion of the hooking portion 124 may perform a rotational motion around the lens bracket 120. Furthermore, as the hooking portion 124 is connected to the handle portion 122b, in the above case, the handle portion 122b pivots with respect to the moving body portion 122a, and thus a distance between the hooking portion 124 and the coupling protrusion 123 may vary. In another exemplary embodiment, the lens bracket 120 may be coupled to the rail 111a by rotating the lens bracket 120 after coupling one of the coupling protrusion 123 and the hooking portion 124 to the rail 111a. First, after the coupling protrusion 123 is coupled to the rail 111a, the lens bracket 120 may be rotated around the coupling protrusion 123. In this state, the user may increase the distance between the hooking portion 124 and the coupling protrusion 123 by bending the handle portion 122b in an opposite direction to the rotation direction of the lens bracket 120. Furthermore, when the hooking portion 124 is first coupled to the rail 111a, the user may rotate the lens bracket 120 around the hooking portion 124. In this state, when the coupling protrusion 123 contacts the rail 111a, the position of the handle portion 122b is changed, and thus the distance between the coupling protrusion 123 and the hooking portion 124 may vary. Accordingly, the lens bracket 120 may be coupled to the rail 111a.

As described above, after changing the position thereof, the lens bracket 120 may fix the position of the lens assembly 140. In this state, as described above, the lens bracket 120 may be fixed through the cover 130 after coupling of the base housing 111, in addition to the contact protrusion 126 and the position fixing protrusion 124b.

In detail, when the arrangement of the lens bracket 120 is completed, the lens assembly 140 may be shielded from the outside by coupling the base housing 111 and the cover 130. In this state, when the cover 130 is coupled to the base housing 111, the force applying portion 132 provided on an inner surface of the cover 130 may contact part of the lens bracket 120 and apply a force to the lens bracket 120 toward the rail 111a. For example, the force applying portion 132 may be arranged to encircle the inner surface of a flat portion of the cover 130. In this state, when the cover 130 is coupled to the base housing 111, the force applying portion 132 may contact at least one of the fixed portion 121 and the partition wall 127 of the lens bracket 120 and apply a force to at least one of the fixed portion 121 and the partition wall 127. In this case, the thickness of the force applying portion 132 may be greater than the distance between an end portion of one of the fixed portion 121 and the partition wall 127 and the inner surface of the flat portion of the cover 130. When the cover 130 is coupled to the base housing 111, the force applying portion 132 may apply a force to one of the fixed portion 121 and the partition wall 127 toward the rail 111a, and thus the lens bracket 120 may be prevented from being moved along the rail 111a by an external force.

Accordingly, the lens bracket 120 may be rapidly and easily mounted on the rail 111a. Furthermore, the position of the lens bracket 120, when the lens bracket 120 moves along the rail 111a, may be prevented from being changed too fast on the rail 111a. The position of the lens bracket 120 on the rail 111a may be easily changed on the rail 111a.

In the security camera 100, the lens bracket 120 may be rapidly and easily replaced. Furthermore, in the security camera 100, after separating at least one of the lens brackets 120 from the rail 111a, the others of the lens brackets 120 may be arranged at desired positions on the rail 111a.

In the security camera 100, since the position of the lens bracket 120 is firmly fixed after the position of the lens bracket 120 is changed, an image at a position desired by a user may be obtained.

Figure 7:
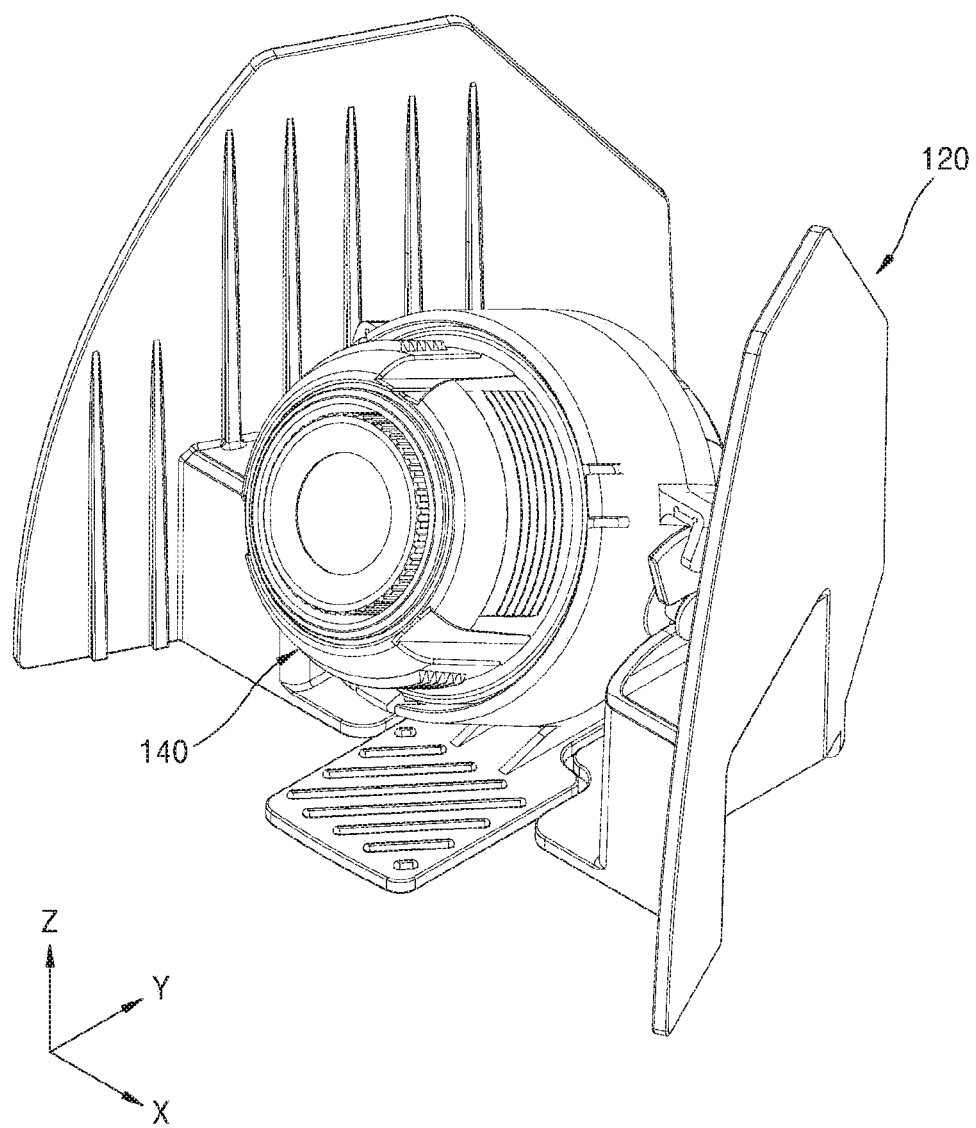
FIG. 7 is an exploded perspective view of a lens assembly illustrated in FIG. 2.
Figure 8:
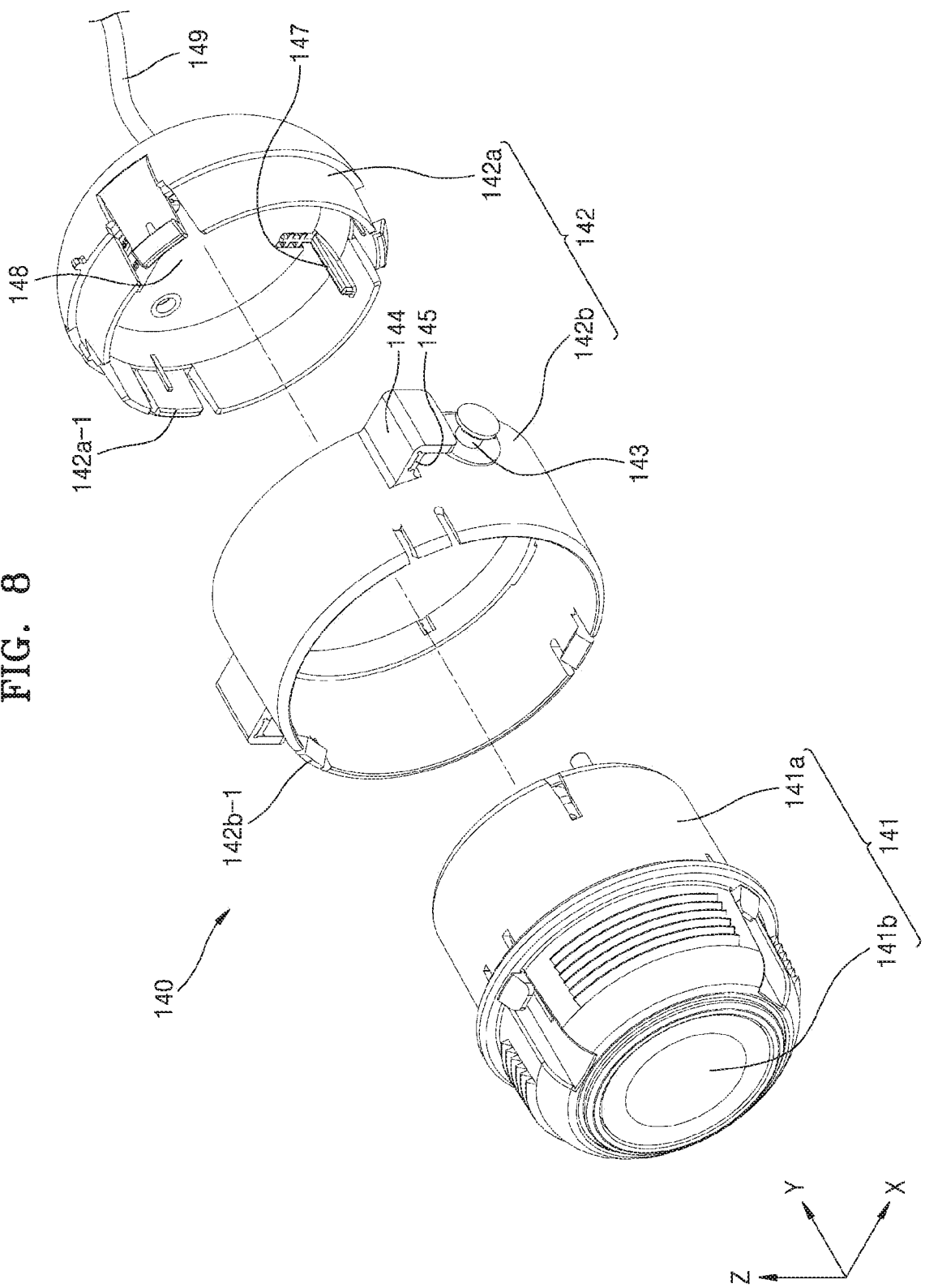
FIG. 8 is an exploded perspective view of the lens bracket and the lens assembly of FIG. 2.
Figure 9A:
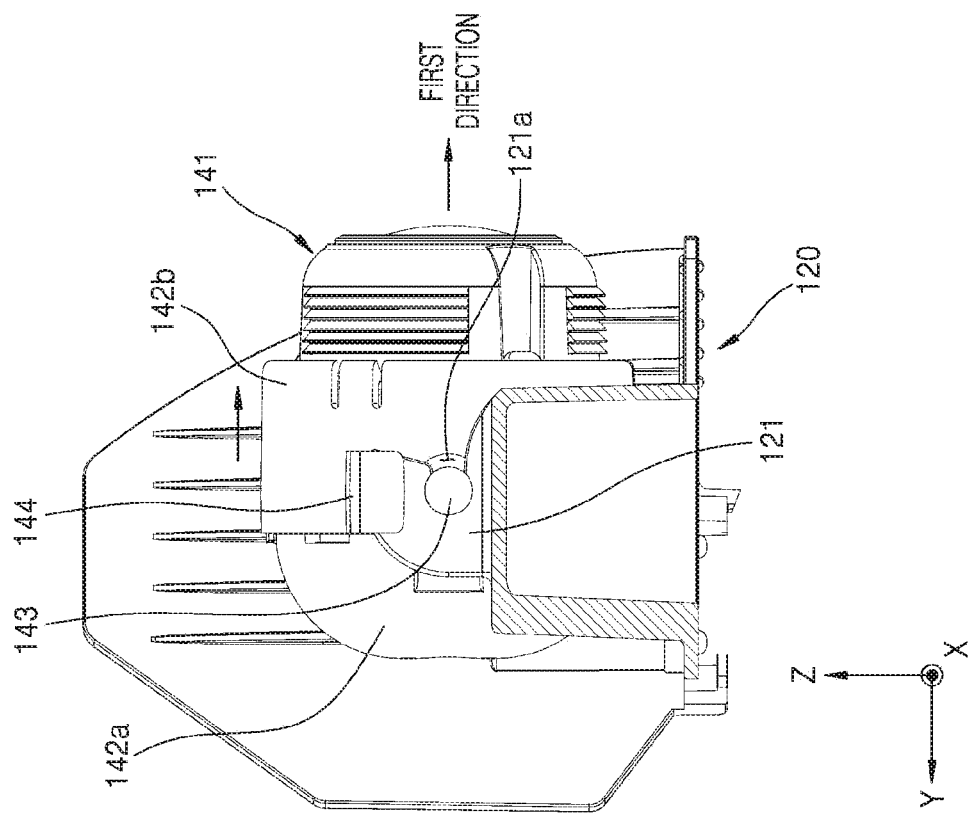
FIGS. 9A and 9B are side views showing a coupling relationship between the lens bracket and the lens assembly illustrated in FIG. 7.
Figure 9B:
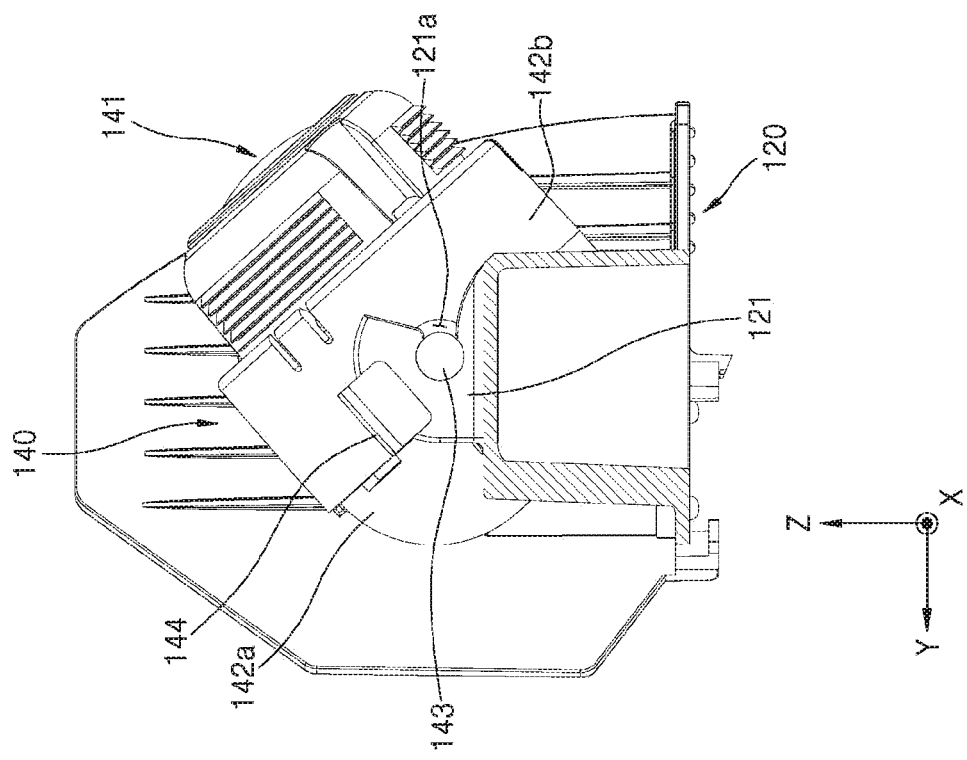

FIG. 7 is an exploded perspective view of the lens assembly 140 of FIG. 2. FIG. 8 is an exploded perspective view of the lens bracket 120 and the lens assembly 140 of FIG. 2. FIGS. 9A and 9B are side views showing a coupling relationship between the lens bracket 120 and the lens assembly 140 illustrated in FIG. 7.

Referring to FIGS. 7 to 9, the lens assembly 140 may include a lens module 141, a lens housing 142, a protruding portion forming a rotation axis 143, a stopper 144, a rotation prevention portion 145, a housing circuit board (not shown), and a housing connector (not shown). In this state, all or some of the lens module 141, the lens housing 142, the rotation axis 143, the stopper 144, and the rotation prevention portion 145 may be formed integrally with one another. Furthermore, the lens module 141, the lens housing 142, the rotation axis 143, the stopper 144, and the rotation prevention portion 145 may be formed separately from one another.

The lens module 141 may include a lens case 141a, at least one lens 141b arranged inside the lens case 141a, and a sensor (not shown) arranged inside the lens case 141a and detecting an image input through the lens 141b. In this state, the lens case 141a may include a plurality of lens cases and thus the lens cases 141a may be coupled to one another using hooks. The lens module 141 may include a circuit board (not shown) where the sensor is arranged and a connector (not shown) connected to the circuit board.

The lens module 141 may be arranged in the lens housing 142. The lens housing 142 may be formed in one body or may be separated into a plurality of pieces. In the following description, for convenience of explanation, a case in which the lens housing 142 includes a plurality of pieces is mainly described in detail.

The lens housing 142 may include a first lens housing 142a, into which the lens case 141a is inserted and to which the lens case 141a is coupled, and a second lens housing 142b arranged to surround the first lens housing 142a and coupled to the first lens housing 142a. In this state, when the first lens housing 142a may include a lens case guide 147 that guides a movement of the lens case 141a when the lens case 141a is inserted into the first lens housing 142a. The lens case guide 147 may be formed in a lengthwise direction of the first lens housing 142a (or in an insertion direction of the lens assembly 140).

The lens case 141a, the first lens housing 142a, and the second lens housing 142b may be coupled to one another by various methods. For example, the lens case 141a, the first lens housing 142a, and the second lens housing 142b may be coupled using screws or bolts. In another exemplary embodiment, the lens case 141a, the first lens housing 142a, and the second lens housing 142b may be coupled to one another using a coupling protrusion (not shown) or a coupling hook (not shown) and a coupling groove (not shown) or a coupling hole (not shown) into which the coupling protrusion or the coupling hook are inserted. In another exemplary embodiment, the lens case 141a, the first lens housing 142a, and the second lens housing 142b may be coupled to one another using a ring member. In this state, the coupling method of the lens case 141a, the first lens housing 142a, and the second lens housing 142b is not limited to the above-described methods and may include a coupling method using all structures and apparatuses enabling coupling of different members. In the following description, for convenience of explanation, a case in which the lens case 141a, the first lens housing 142a, and the second lens housing 142b are coupled to one another using a hook and a hole is mainly described in detail.

The lens case 141a may be inserted into the first lens housing 142a. The first lens housing 142a may be inserted into the second lens housing 142b. In this state, the first lens housing 142a may include a first coupling hook 142a-1 that is caught by an edge of the second lens housing 142b. The second lens housing 142b may include a second coupling hook 142b-1 that is caught by an edge of the lens case 141a. When the lens module 141 is inserted into the first lens housing 142a, the first coupling hook 142a-1 may be pressed toward the second lens housing 142b. In this state, the second lens housing 142b may separately include a catch member or a protrusion to catch the first coupling hook 142a-1. When the lens module 141 is inserted into the first lens housing 142a, the catch member and the first coupling hook 142a-1 are in close contact with each other to be firmly coupled to each other. Furthermore, the first lens housing 142a may be rotatably coupled to the second lens housing 142b. Accordingly, the lens assembly 140 and the first lens housing 142a may rotate inside the second lens housing 142b.

The rotation axis 143 may be formed on the lens housing 142. For example, the rotation axis 143 may protrude from the second lens housing 142b. In this state, the rotation axis 143 may be inserted into the insertion groove 121a of the fixed portion 121, and a diameter of a end portion of the rotation axis 143 may be greater than a diameter of the other part of the rotation axis 143.

The stopper 144 may protrude from the lens housing 142. In particular, the stopper 144 may be formed on the second lens housing 142b. The stopper 144 may have a long side in a lengthwise direction of the lens module 141 (or in a direction in which light is incident on the lens module 141, a direction along an optical axis of the lens 141b, or a first direction). In an exemplary embodiment, as the stopper 144 is partially bent, the stopper 144 may shield at least two surfaces of the fixed portion 121. For example, the stopper 144 may shield a side surface and an upper surface of the fixed portion 121. Accordingly, the stopper 144 may prevent the lens module 141 from being shaken during rotation of the lens module 141. In another exemplary embodiment, the stopper 144 may be formed as a flat surface perpendicular to the upper surface of the fixed portion 121. In this case, the stopper 144 does not have a part arranged corresponding to the side surface of the fixed portion 121 of FIG. 8.

As described above, when the lens assembly 140 rotates, the stopper 144 may limit a separation angle at which the lens assembly 140 is separated from the fixed portion 121. For example, when the lens assembly 140 is within a particular angular range, the stopper 144 contacts with the fixed portion 121 and may prevent the rotation axis 143 from being drawn from the insertion groove 121a. In this state, the particular angular range may include an angle at which the light incident on the lens assembly 140 is not blocked by at least one of the base housing 111, the fixed housing 112, and the cover housing 113. For example, the particular angular range may be within about 180° from a position where at least one of the base housing 111, the fixed housing 112, and the cover housing 113 meets the cover 130. In other words, when the optical axis of the lens 141b is arranged on a surface parallel to the upper surface of the base housing 111 or under the surface, the lens assembly 140 may be separated from the fixed portion 121. In this state, the angle of the lens assembly 140 may be measured in one of a clockwise direction and a counterclockwise direction based on a case when the optical axis of the lens 141b is parallel to the upper surface of the base housing 111.

Furthermore, as described above, the stopper 144 allows the lens assembly 140 to be separated from the fixed portion 121 only in a first direction in which the insertion groove 121a is formed. In addition, in the stopper 144, a separation angle range of the lens assembly 140 may be limited according to the size of the insertion groove 121a. For example, when the lens assembly 140 is within a separation angle range other than the above-described particular angular range, as the lens assembly 140 is drawn from the fixed portion 121, the progress of the stopper 144 is not interrupted by the fixed portion 121, and thus the rotation axis 143 may be separated from the insertion groove 121a. In this state, the separation angle range in which the lens assembly 140 is separated from the fixed portion 121 may be an angle range in which the progress of the stopper 144 is not interrupted by the fixed portion 121 even when the lens assembly 140 rotates, according to the width of the insertion groove 121a.

The rotation prevention portion 145 may be arranged on at least one of the stopper 144 and the fixed portion 121. In this state, the rotation prevention portion 145 may be formed in various shapes. For example, the rotation prevention portion 145 may include a frictional member that is arranged on at least one of the stopper 144 and the fixed portion 121. In this case, the frictional member may include rubber or silicon. In another exemplary embodiment, the rotation prevention portion 145 may include a protrusion that is arranged on at least one of surfaces of the stopper 144 and the fixed portion 121. In this state, the rotation prevention portion 145 may include a fine protrusion such that a portion of at least one of the stopper 144 and the fixed portion 121 contacting each other is rougher than the other portion thereof. The rotation prevention portion 145 may include gear teeth arranged on each of the stopper 144 and the fixed portion 121.

A housing circuit board 148 may be arranged in the first lens housing 142a. In this state, the housing circuit board 148 may be connected to the circuit board via the housing connector. Furthermore, the housing connector may be connected to a cable 149.

As described above, the lens assembly 140 may be separated from the lens bracket 120 or arranged on the lens bracket 120. For example, the rotation axis 143 may be inserted into the insertion groove 121a by drawing the rotation axis 143 from the insertion groove 121a of the fixed portion 121. In this case, in the lens assembly 140, when the optical axis of the lens 141b is in the separation angle range, the rotation axis 143 may be drawn from the insertion groove 121a or inserted into the insertion groove 121a. When the rotation axis 143 is inserted into the groove 121a, the stopper 144 may contact an outer surface of the fixed portion 121. In this state, a part of the stopper 144 that contacts the fixed portion 121 is formed in the same direction as the first direction in which the insertion groove 121a is formed, and thus no interference with the fixed portion 121 occurs when the rotation axis 143 is inserted into or drawn from the insertion groove 121a.

An entrance portion of the insertion groove 121a through which the rotation axis 143 is inserted or drawn may be formed to guide the rotation axis 143 to the inside of the insertion groove 121a. For example, the size of the outermost end of the entrance portion of the insertion groove 121a may be greater than the size of the inside of the insertion groove 121a. In this case, the insertion groove 121a may be formed to have a size that decreases by a certain length in the entrance portion and then increases to a certain size. In other words, in the insertion groove 121a, the entrance portion is formed greater than the other portion, and thus, even when the rotation axis 143 is inserted into the insertion groove 121a in various directions, the rotation axis 143 may be easily guided to the inside of the insertion groove 121a. In addition, since the entrance portion of the insertion groove 121a is formed inclined, the rotation axis 143 may be guided to the center portion of the insertion groove 121a.

After the rotation axis 143 is inserted into the insertion groove 121a, the lens assembly 140 may be rotated. In this state, the stopper 144 may be moved along the outer surface of the fixed portion 121. In particular, since the rotation prevention portion 145 is arranged between the stopper 144 and the fixed portion 121 and contacts the outer surface of the fixed portion 121, the lens assembly 140 may be prevented from rotating too fast, and further, when the lens assembly 140 stops rotating, the lens assembly 140 may be prevented from rotating due to the weight of the lens assembly 140, and thus the position of the lens assembly 140 may be fixed.

As described above, the outer surface of the fixed portion 121 over which the stopper 144 moves may be formed curved. For example, the outer surface of the fixed portion 121 over which the stopper 144 moves may have an arc of a semicircle or a fan shape, or a part of an ellipse. In this state, the outer surface of the fixed portion 121 may guide a rotation path of the lens assembly 140.

Accordingly, in the security camera 100, the lens assembly 140 may be easily and freely replaced. Furthermore, in the security camera 100, the lens assembly 140 may be separated only in the separation angle range.

Figure 10:
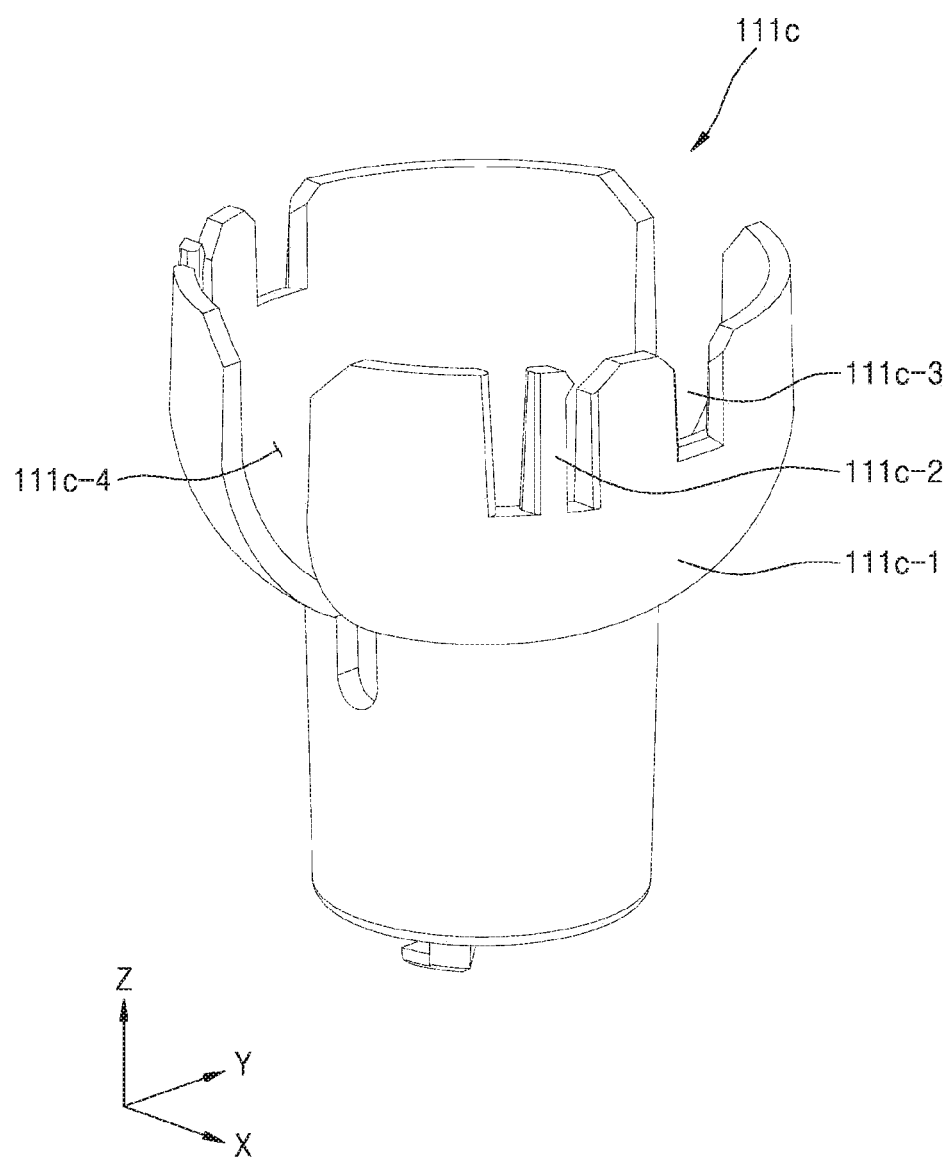
FIG. 10 is a perspective view of the lens assembly accommodation portion illustrated in FIG. 2.
Figure 11A:
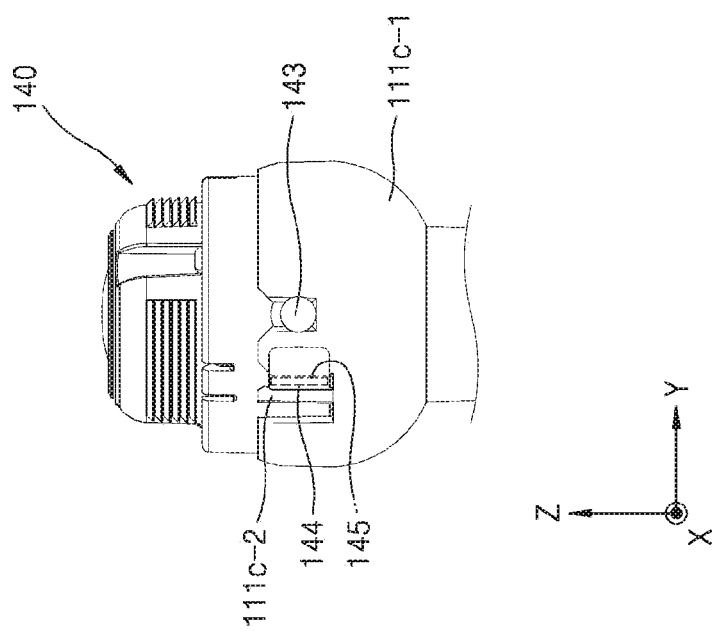
FIGS. 11A and 11B are side views showing that the lens assembly is coupled to the lens assembly accommodation portion of FIG. 10.
Figure 11B:
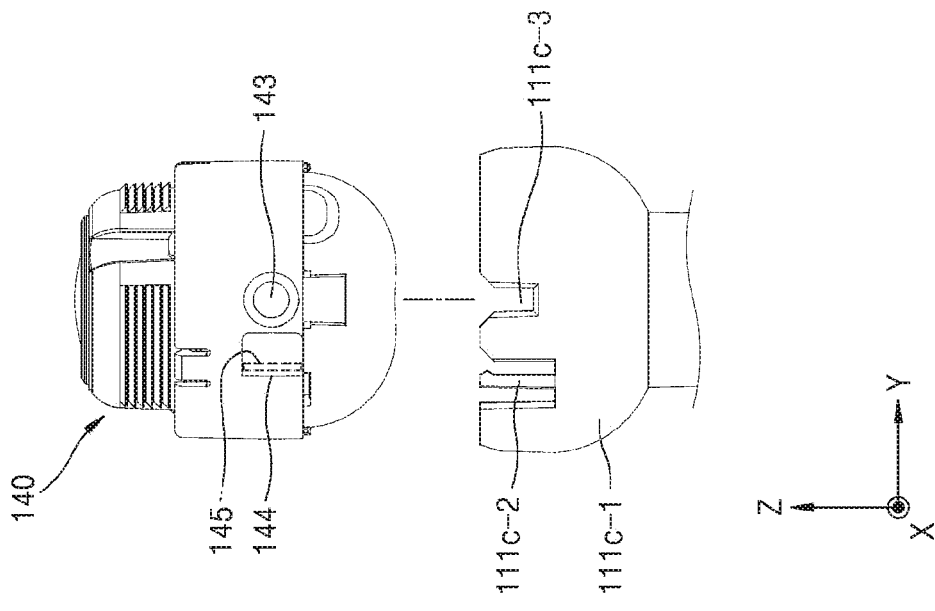

FIG. 10 is a perspective view of the lens assembly accommodation portion illustrated in FIG. 2. FIGS. 11A and 11B are side views showing that the lens assembly 140 is coupled to the lens assembly accommodation portion of FIG. 10.

Referring to FIGS. 10 and 11, the lens assembly accommodation portion 111c may include a lens assembly accommodation portion body 111c-1 into which the lens assembly 140 is inserted and fixed. Furthermore, the lens assembly accommodation portion 111c may include a snap fit 111c-2 that is pivotably arranged on the lens assembly accommodation portion body 111c-1. In this state, in the lens assembly accommodation portion body 111c-1, a separate groove may be formed at both sides of the snap fit 111c-2 not to prevent the motion of the snap fit 111c-2 when the snap fit 111c-2 is moved. A rotation axis insertion groove 111c-3, into which the rotation axis 143 is inserted, may be formed in the lens assembly accommodation portion body 111c-1. Furthermore, a cable insertion groove 111c-4, into which a cable (not shown) of the lens assembly 140 is inserted, may be formed in the lens assembly accommodation portion body 111c-1.

As described above, the lens assembly 140 may be separated from a lens bracket (not shown) and inserted into the lens assembly accommodation portion 111c.

In detail, after being separated from the lens bracket 120, the lens assembly 140 may be arranged in the lens assembly accommodation portion 111c and then inserted into the lens assembly accommodation portion 111c. In this state, the rotation axis 143 may be inserted into the rotation axis insertion groove 111c-3. Furthermore, the stopper 144 may contact the snap fit 111c-2. In this case, when the lens assembly 140 is continuously inserted into the lens assembly accommodation portion 111c, the stopper 144 presses the snap fit 111c-2, and thus the snap fit 111c-2 may pivot. Then, when the stopper 144 passes over a part of the snap fit 111c-2, the snap fit 111c-2 may restrict the stopper 144. In this state, as a part of the snap fit 111c-2 protrudes, the stopper 144 may be caught by the protruding part of the snap fit 111c-2. In particular, the protruding portion of the snap fit 111c-2 is arranged at an end portion of the snap fit 111c-2, and after restricting the stopper 144, the stopper 144 may be prevented from escaping from the snap fit 111c-2.

As described above, when the lens assembly 140 is coupled to the lens assembly accommodation portion 111c, the cable of the lens assembly 140 may be drawn from the cable insertion groove 111c-4. In this state, the cable may be drawn from the side surface of the lens assembly accommodation portion 111c via the cable insertion groove 111c-4.

Accordingly, in the security camera 100, the lens assembly 140 arranged on the rail 111a may be fixed to the lens assembly accommodation portion 111c arranged at the center of the rail 111a. Furthermore, in the security camera 100, the same lens assembly 140 may be commonly used in the rail 111a and the lens assembly accommodation portion 111c.

As described above, in the security camera according to the above-described exemplary embodiment, the lens bracket may be rapidly and easily replaced.

Furthermore, in the security camera according to the above-described exemplary embodiment, after at least one of a plurality of lens brackets is separated from the rail, the other of the lens brackets may be arranged at desired positions on the rail.

In the security camera according to the above-described exemplary embodiment, since the position of the lens bracket may be firmly fixed after the position of the lens bracket is changed, an image at a position desired by the user may be obtained.

According to the above-described exemplary embodiments, the lens bracket may be rapidly and easily mounted.

Furthermore, according to the above-described exemplary embodiments, the position of the lens bracket may be prevented from being changed too fast during moving along the rail.

According to the above-described exemplary embodiments, the position of the lens bracket on the rail may be easily changed.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lens bracket comprising:
   a fixed portion;
   a lens assembly provided on the fixed portion;
   a moving portion connected to the fixed portion and configured to move along a rail;
   a coupling protrusion provided on the moving portion and coupled to an inner surface of the rail; and
   a hooking portion provided on the moving portion, the hooking portion facing the coupling protrusion, and contacting a rail protrusion of the rail.

2. The lens bracket of claim 1, wherein the hooking portion comprises:
   a coupling connection portion protruding from the moving portion toward the rail, at least a part of the coupling connection portion being bent to surround a side surface of the rail; and
   a position fixing protrusion protruding from the coupling connection portion toward the rail protrusion of the rail.

3. The lens bracket of claim 1, wherein the coupling protrusion protrudes from the moving portion toward the rail, and at least a part of the coupling protrusion is bent to surround the inner surface of the rail.

4. The lens bracket of claim 1, wherein the moving portion comprises:
   a moving body portion; and
   a handle portion provided separately from the moving body portion, the hooking portion being connected to the handle portion.

5. The lens bracket of claim 1, further comprising a guide that is spaced apart from the hooking portion and protruding from the moving portion extend along a portion of an outer surface of the rail.

6. The lens bracket of claim 1, further comprising a contact protrusion that protrudes from a lower surface of the moving portion toward the rail.

7. A security camera comprising:
   a lens assembly;
   a lens bracket, wherein a protruding portion of the lens assembly is rotatably inserted into the lens bracket; and
   a stopper provided on the lens assembly and configured to be in contact with the lens bracket at an end of rotation of the lens assembly,
   wherein the stopper is configured to determine a rotation angle range in which the protruding portion of the lens assembly is drawn from an open portion of the lens bracket to separate the lens assembly and the lens bracket.

8. The security camera of claim 7, further comprising a rotation prevention portion that is provided on at least one of the lens bracket and the stopper.

9. The security camera of claim 7, wherein a part of the lens bracket that the stopper contacts is curved.

10. A security camera comprising:
    a lens assembly;
    a lens bracket, wherein a protruding portion of the lens assembly is rotatably inserted into the lens bracket and the lens assembly is separated from the lens bracket; and
    a lens assembly accommodation portion spaced apart from the lens bracket, the lens assembly is inserted and fixed into the lens assembly accommodation portion.

11. The security camera of claim 10, wherein the lens assembly comprises a stopper configured to determine a rotation angle range in which the protruding portion of the lens assembly is drawn from an open portion of the lens bracket to separate the lens assembly and the lens bracket.

12. The security camera of claim 11, further comprising a rotation prevention portion that is provided on at least one of the lens bracket and the stopper.

13. The security camera of claim 11, wherein a part of the lens bracket that the stopper contacts is curved.

14. The security camera of claim 11, wherein the lens assembly accommodation portion comprises a snap fit, wherein the stopper is inserted and fixed into the snap fit.

15. The security camera of claim 10, wherein the lens assembly comprises:
   a lens module;
   a lens housing in which the lens module is provided;
   a rotation axis protruding from the lens housing and inserted into an insertion groove; and
   a stopper protruding from the lens housing and configured to move in contact with an outer surface of a fixed portion at an end of rotation of the lens housing.

16. The security camera of claim 15, further comprising a rotation prevention portion that is provided on at least one of the fixed portion and the stopper.

17. The security camera of claim 15, wherein a part of the fixed portion that the stopper contacts is curved.

18. The security camera of claim 17, wherein the lens assembly accommodation portion comprises a snap fit, wherein the stopper is inserted and fixed into the snap fit.

19. The security camera of claim 10, wherein the lens assembly accommodation portion comprises a rotation axis insertion groove into which a rotation axis of the lens assembly is inserted.

20. The security camera of claim 10, wherein the lens assembly comprises a plurality of lens assemblies and the lens bracket comprises a plurality of lens brackets,
   a circular rail is provided on which the plurality of lens brackets independently move,
   one of the plurality of lens assemblies is provided on the lens assembly accommodation portion located at a center of the rail, and
   other lens assemblies of the plurality of lens assemblies are provided on the plurality of lens brackets spaced apart from one another.

\* \* \* \* \*